United States Patent
Zein et al.

(10) Patent No.: US 12,092,001 B2
(45) Date of Patent: Sep. 17, 2024

(54) METHOD FOR CONTROLLING AN INTERNAL COMBUSTION ENGINE INCLUDING AT LEAST ONE EXHAUST-GAS AFTERTREATMENT COMPONENT HAVING AN ELECTRIC HEATING ELEMENT

(71) Applicant: Robert Bosch GmbH, Stuttgart (DE)

(72) Inventors: Thomas Zein, Sindelfingen (DE); Andreas Fritsch, Waiblingen (DE); Michael Bachner, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/355,334

(22) Filed: Jul. 19, 2023

(65) Prior Publication Data

US 2024/0035408 A1 Feb. 1, 2024

(30) Foreign Application Priority Data

Jul. 26, 2022 (DE) .................. 10 2022 207 605.2

(51) Int. Cl.
F01N 11/00 (2006.01)
B01D 46/42 (2006.01)
(Continued)

(52) U.S. Cl.
CPC ........ F01N 11/002 (2013.01); B01D 46/4263 (2013.01); B01D 46/444 (2013.01);
(Continued)

(58) Field of Classification Search
CPC . F01D 9/041; F01D 9/042; F02C 7/16; F05D 2240/35
See application file for complete search history.

(56) References Cited

U.S. PATENT DOCUMENTS

| | | | | |
|---|---|---|---|---|
| 5,419,122 A | * | 5/1995 | Tabe | F01N 11/002 60/284 |
| 7,059,117 B2 | * | 6/2006 | Ripper | F01N 3/208 60/303 |
| 7,159,392 B2 | * | 1/2007 | Kondoh | F02D 41/1467 60/285 |

FOREIGN PATENT DOCUMENTS

| | | | | |
|---|---|---|---|---|
| DE | 102014226079 A1 | * | 6/2016 | .......... B60K 35/00 |
| DE | 102020104179 A1 | * | 8/2021 | |
| JP | 7254724 B2 | * | 4/2023 | .......... F01N 11/00 |

* cited by examiner

Primary Examiner — Jesse S Bogue
(74) Attorney, Agent, or Firm — NORTON ROSE FULBRIGHT US LLP; Gerard A. Messina

(57) ABSTRACT

A method for controlling an internal combustion engine including at least one exhaust-gas aftertreatment component having an electric heating element, the electric heating element heating the exhaust-gas aftertreatment component and the exhaust gas flowing through the exhaust-gas aftertreatment component, the electric heating element briefly or permanently being acted upon by a heating current, a gas, in particular fresh air and/or exhaust gas, flowing downstream through the exhaust-gas path. In the method, a first temperature upstream from the at least one exhaust-gas aftertreatment component is ascertained, a second temperature downstream from the exhaust-gas aftertreatment component is ascertained, and the exhaust-gas mass flow of the internal combustion engine is ascertained as a function of a first temperature difference between the first and the second temperature and a heating power of the electric heating element, and the internal combustion engine is controlled as a function of the exhaust-gas mass flow.

13 Claims, 3 Drawing Sheets

(51) Int. Cl.
*B01D 46/44* (2006.01)
*B01D 53/94* (2006.01)
*F01N 3/027* (2006.01)
*F01N 3/10* (2006.01)
*F01N 3/20* (2006.01)
*F02D 41/02* (2006.01)
*F02D 41/22* (2006.01)

(52) U.S. Cl.
CPC ....... *B01D 46/448* (2013.01); *B01D 53/9495* (2013.01); *F01N 3/027* (2013.01); *F01N 3/101* (2013.01); *F01N 3/106* (2013.01); *F01N 3/108* (2013.01); *F01N 3/2013* (2013.01); *F01N 3/2066* (2013.01); *F02D 41/0235* (2013.01); *F02D 41/222* (2013.01); *B01D 2258/01* (2013.01); *B01D 2273/20* (2013.01); *B01D 2279/30* (2013.01); *F01N 2550/02* (2013.01); *F01N 2550/04* (2013.01); *F01N 2550/05* (2013.01); *F02D 2041/228* (2013.01)

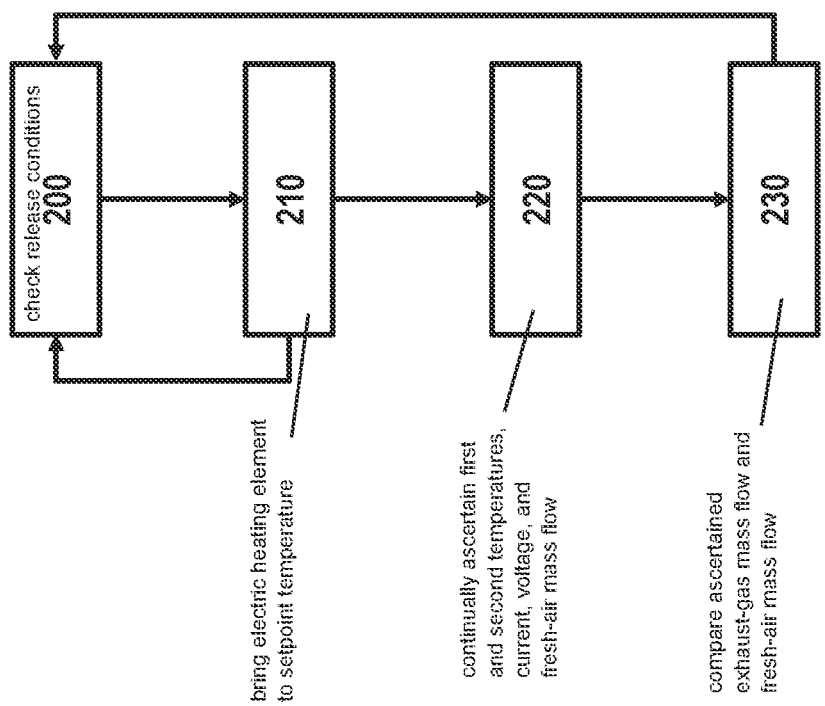

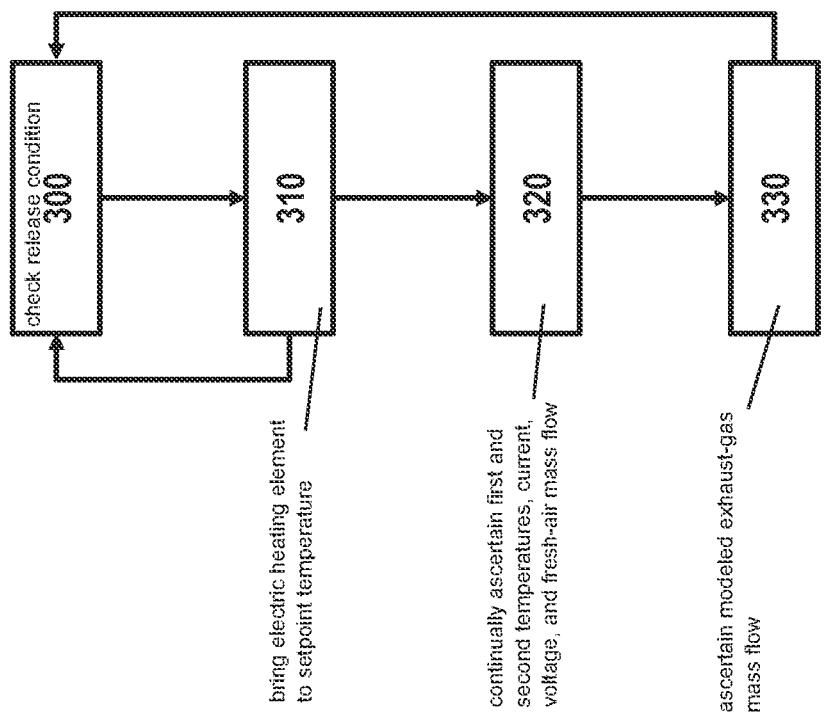

METHOD FOR CONTROLLING AN INTERNAL COMBUSTION ENGINE INCLUDING AT LEAST ONE EXHAUST-GAS AFTERTREATMENT COMPONENT HAVING AN ELECTRIC HEATING ELEMENT

CROSS REFERENCE

The present application claims the benefit under 35 U.S.C. § 119 of German Patent Application No. DE 10 2022 207 605.2 filed on Jul. 26, 2022, which is expressly incorporated herein by reference in its entirety.

BACKGROUND INFORMATION

The continual tightening of existing exhaust-gas limit values and the regulation of additional pollutant components such as ammonia (NH3) in the different motor vehicle markets EU, US and CN lead to a greater complexity of the exhaust-gas aftertreatment systems, which are usually made up of multiple catalytic converters connected in series. Apart from catalytic converters situated in close proximity to the engine, catalytic converters in the underfloor are also used for space reasons.

Due to more stringent EU7 emission requirements, the use of electric heating disks in catalytic converters has increased. The electric energy from the onboard electrical system allows for the introduction of heat into the exhaust-gas system independently of the engine conditions and especially already in a stationary engine, the heat being transported into the downstream catalytic converters with the aid of the exhaust-gas mass flow from the engine or using externally supplied transport air.

The increasing tightening of the emission regulations require a rapid attainment of the light-off temperatures of the exhaust-gas aftertreatment components, which can be positively influenced by the use of electric heating elements.

SUMMARY

In a first aspect, the present invention relates to a method for controlling an internal combustion engine including at least one exhaust-gas aftertreatment component having an electric heating element, the electric heating element heating the at least one exhaust-gas aftertreatment component and the exhaust gas flowing through the at least one exhaust-gas aftertreatment component, the electric heating element being briefly or permanently acted upon by a heating current, in particularly constantly or in alternation,
 a gas, in particular fresh air and/or exhaust gas, flowing downstream through the exhaust path. According to an example embodiment of the present invention, a first temperature upstream from the at least one exhaust-gas aftertreatment component is ascertained,
 a second temperature downstream from the at least one exhaust-gas aftertreatment component is ascertained,
 the exhaust-gas mass flow of the internal combustion engine is ascertained as a function of a first temperature difference between the first and the second temperature and a heating power of the electric heating element, and the internal combustion engine is controlled as a function of the exhaust-gas mass flow.

The present method may offer a special advantage that the exhaust-gas mass flow is able to be ascertained as a function of the temperatures upstream and downstream from the at least one exhaust-gas aftertreatment component and the heating power with an activated electric heating element.

Through an exhaust-gas mass flow such as from the combustion engine or from an injection of secondary air, the thermal energy is carried away from the electric heating element to the downstream catalytic converters. This heats the exhaust gas which is flowing through the electric heating element. The greater the mass flow and the greater the temperature difference between the inflowing transport air and the electric heating element, the more heat is carried away by the transport air. This effect may be utilized to ascertain the exhaust-gas mass flow.

In an alternative embodiment of the present invention, a release for the method is granted when a trailing throttle operation is detected for the internal combustion engine and/or when an activation of the electric heating element has occurred.

Moreover, a stationary state exists for the electric heating element when an actual temperature for the electric heating element exceeds a setpoint temperature for electric heating element 4 for a predefinable period of time.

According to an example embodiment of the present invention, a special advantage results if a stationary state is reached for the electric heating element because the electric heating element predominantly or completely emits its thermal energy to the passing exhaust gas. This therefore allows for a robust execution of the present method.

In a special example embodiment of the present invention, a stationary state is present for the electric heating element when a predefinable time period after the electric heating element has been activated has elapsed. A special advantage results when a stationary state is reached for the electric heating element because the electric heating element emits its thermal energy predominantly or completely to the passing exhaust gas. The present method may thus be executed in a robust manner.

In addition, the at least one exhaust-gas aftertreatment component may be a three-way catalytic converter or a particulate filter or a selective catalytic reduction catalyst or a NOx storage catalyst or an oxidation catalyst.

In one special example embodiment of the present invention, the electric heating power is ascertained as a function of a voltage and an electric current for the electric heating element.

In an advantageous embodiment of the present invention, the exhaust-gas mass flow is ascertained according to the following formula:

$$dm_{Exh} = \frac{Pwr_{EHC}}{(cp_{Exh} \cdot \Delta T_{Exh})} = \frac{Pwr_{EHC}}{(cp_{Exh} \cdot (T_{ExhDs} - T_{ExhUs}))}$$

with the electrically introduced power into the electric heating element, the specific thermal capacity of the exhaust gas at a constant pressure, the first temperature difference between the exhaust-gas temperature downstream and the exhaust-gas temperature upstream from the at least one exhaust-gas aftertreatment component.

In addition, a fresh-air mass flow may be compared to the exhaust-gas mass flow, and a defective air-mass sensor is able to be identified as a function of whether a difference between the fresh-air mass flow and the exhaust-gas mass flow exceeds or undershoots a predefinable upper or lower threshold value.

Moreover, according to an example embodiment of the present invention, a modeled exhaust-gas mass flow is ascertained as a function of a fresh-air mass flow, a secondary air mass flow, and an injected fuel quantity, and if a difference between the modeled exhaust-gas mass flow and the exhaust-gas mass flow ascertained via the electric heating element exceeds or undershoots an upper or lower threshold value, the heating power for the electric heating element is shut off or restricted.

An uneven flow through the electric heating element may have the result that the heat generated by the electric heating is not dissipated evenly or is convectively carried away only at certain locations of the electric heating element or not at all. Local overheating (hot spots) may thus occur at these locations. By restricting the heating power or by switching off the electric heating element, a component protection is able to be realized.

The equations used in the present invention are based on the simplification of an OD model. In other words, the underlying assumption is that the temperature of the electric heating element and the exhaust-gas temperature are able to be mapped by a selective representative value. For example, this may be a mean temperature for the electric heating element and a mean exhaust-gas temperature across the cross-sectional area and the length of the electric heating element.

In the same way, it is assumed that an even flow through the heating disk by the exhaust-gas mass flow takes place, and the electric heating power is introduced in an evenly distributed manner across the surface of the heating disk. In reality, with a disadvantageous flow toward the electric heating element, a locally quite different flow through the electric heating element may come about. Strong overheating (so-called hot spots) may therefore occur in zones that have a very low throughflow. Based on the deviation between the modeled exhaust-gas mass flow and the mass flow ascertained as a function of the heating disks, it is therefore possible to infer an uneven flow through the electric heating element.

In one special example embodiment of the present invention, an error bit is set in the control device if a defective air-mass sensor or a deactivation or restriction of the heating power for the electric heating element is identified, or an engine control light may be activated on the dashboard.

In further aspects, the present invention relates to a device, in particular a control device and a computer program, which are designed, in particular programmed, to execute one of the methods. In a still further aspect, the present invention relates to a machine-readable memory medium on which the computer program is stored.

BRIEF DESCRIPTION OF EXAMPLE EMBODIMENTS

In the following text, the present invention will be described in greater detail with the aid of an exemplary embodiment shown in the figures.

FIG. 2 shows a flow diagram for the graphical representation of the sequence of a first exemplary embodiment of the present invention.

FIG. 3 shows a flow diagram for the graphical representation of the sequence of a second exemplary embodiment of the present method.

DETAILED DESCRIPTION OF EXAMPLE EMBODIMENTS

Figure 1:
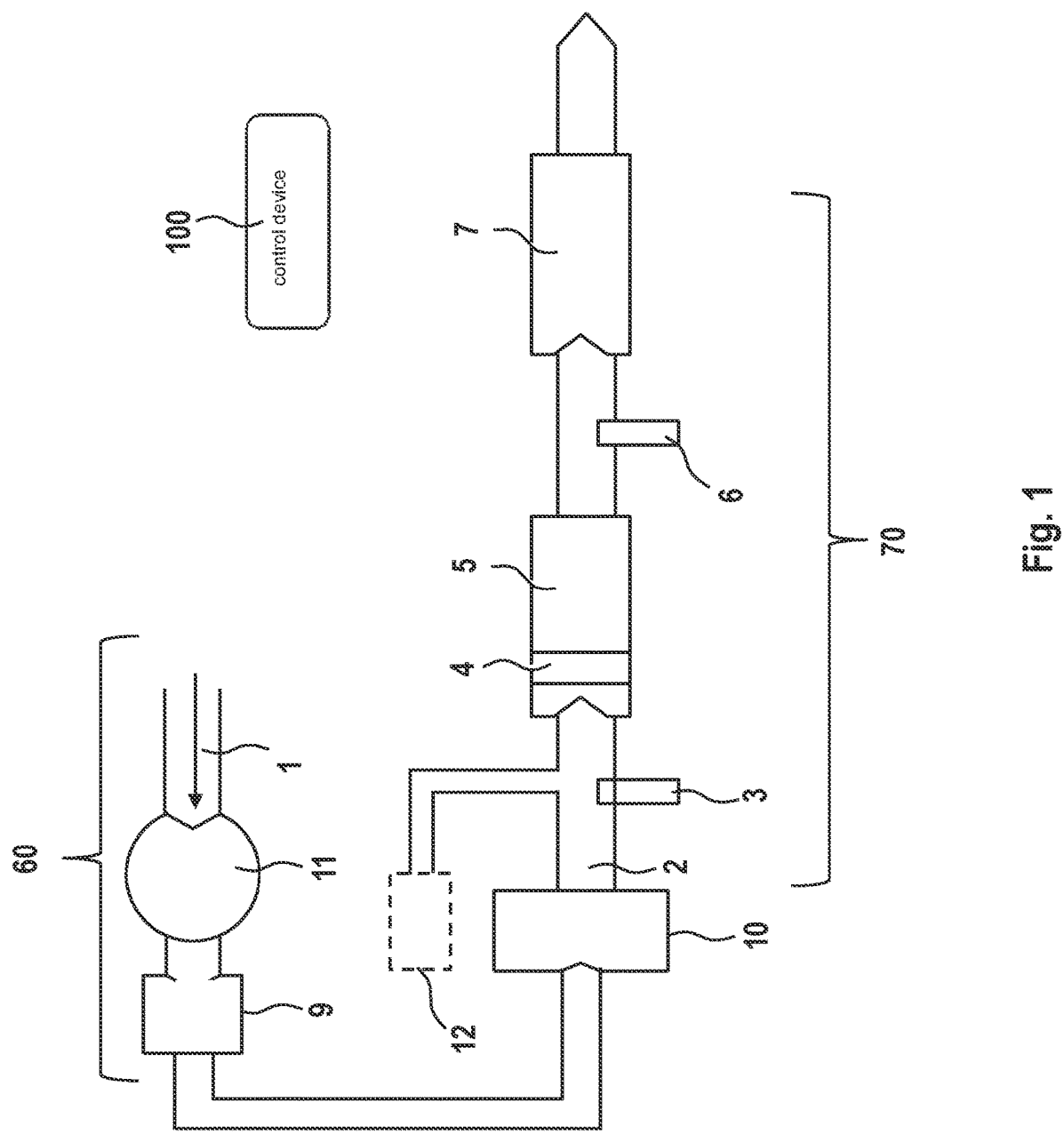
FIG. 1 shows a schematic representation of an internal combustion engine including at least one exhaust-gas aftertreatment component having an electric heating element.

From FIG. 1, an internal combustion engine 10 may be gathered, which is connected to a fresh-air path 1 on the input side, and to an exhaust-gas path 2 on the discharge side. Internal combustion engine 10 is preferably a gasoline engine or a diesel engine. In addition, internal combustion engine 10 may have an actuator device (not shown further) for metering fuel into each cylinder, and an adjustment device for the valve-lift curves, e.g., a camshaft adjustment device (not shown further) for internal combustion engine 10.

Via input valves (not shown), air supply 60 of fresh-air path 1 is connected to the cylinders of internal combustion engine 10 in a conventional manner. Combustion exhaust gas is expelled via corresponding discharge valves (not shown) of the cylinders into exhaust-gas system 70 in a generally conventional manner In addition, a turbocharger (not shown) may be disposed in exhaust-gas path 2, and a compressor 11 and an air-mass meter 9 in fresh-air path 1. Air-mass meter 9 may preferably be a hot-film air-mass meter 9 (HFM) or a pressure-based air-mass meter 9 (PFM) for the ascertainment of fresh-air mass flow $dm_{Air}$. The exhaust gas produced during the combustion process in internal combustion engine 10 is discharged via exhaust-gas path 2. The exhaust gas is subjected to an exhaust-gas aftertreatment. To this end, a first temperature sensor 3, a first exhaust-gas aftertreatment component 5 featuring an electric heating element, a second temperature sensor 6, and an optional second exhaust-gas aftertreatment component 7 are disposed downstream in exhaust-gas path 2.

First temperature sensor 3 measures a first temperature $T_{ExhUs}$ downstream from internal combustion engine 10 and upstream from at least one exhaust-gas aftertreatment component 5. Second temperature sensor 6 measures a second temperature $T_{ExhDs}$ downstream from the at least one exhaust-gas aftertreatment component 5. In one advantageous embodiment, first temperature $T_{ExhUs}$ is also ascertainable with the aid of a temperature model using control device 100. The temperature model may preferably be ascertained as a function of exhaust-gas mass flow $dm_{Exh}$, fresh-air mass flow $dm_{Air}$ of injected fuel quantity $q_{inj}$.

Moreover, the system may have an optional secondary-air pump 12 by which fresh air or a fresh-air mass flow is able to be introduced into exhaust-gas system 2. The secondary air is preferably introduced into exhaust-gas tract 2 upstream from the at least one exhaust-gas aftertreatment component 5 so that the fresh air flows downstream in the direction of the exhaust gas toward the outlet of the exhaust pipe.

The at least one first exhaust-gas cleaning component 5 may preferably be an oxidation catalyst, a selective catalytic reduction catalyst, a particulate filter, a NOx storage catalyst or a similar device. Important in this context is that the at least first exhaust-gas cleaning component 5 is provided with an electric heating element 4.

Electric heating element 4 may preferably be developed as an electric heating disk which, when activated, heats the at least one exhaust-gas cleaning component 5 and also gas or exhaust gas flowing past. In the following text, exhaust gas is also to be understood as a mixture of supplied fresh air and/or exhaust gas from internal combustion engine 10. In addition, a control for electric heating element 4 is stored in control device 100. The activation is predominantly implemented by control device 100, and a setpoint temperature $T_{EHC,Setpoint}$ is specified for electric heating element 4 by the control. In addition, control device 100 is able to ascertain a voltage $U_{EHC}$ and an electric current $I_{EHC}$ for electric heating element 4. Based on a current and voltage readback $I_{EHC}, U_{EHC}$, control device 100 is able to determine an actual temperature $T_{EHC,actual}$ for electric heating element 4. The control stored in control device 100 is preferably a setpoint-actual control.

Heating power $Pwr_{EHC}$ of electric heating element 4 is able to be determined in the following manner:

$$Pwr_{EHC} = dQ_{Exh} + dQ_{ECH} + dQ_{EHC \to Env}$$

with $Pwr_{EHC}$ being the heating power for heating both electric heating element 4 and the supplied exhaust-gas mass flow, and also to compensate for the thermal wall losses to the environment.

$$dQ_{Exh} = dm_{Exh} \cdot cp_{exh} \cdot \Delta T_{Exh}$$

$$dQ_{EHC} = m_{EHC} \cdot cp_{EHC} \cdot \Delta T_{EHC} / ti_{HeatUp}$$

$$dQ_{EHC \to Env} = \alpha \cdot A \cdot (T_{Env} - T_{EHC,1st})$$

with $dQ_{Exh}$ being the thermal output introduced into the exhaust gas, $dQ_{EHC}$ the thermal output introduced into electric heating element 4, $dQ_{EHC \to Env}$ the thermal energy output to the environment or ambient air, $Pwr_{EHC}$ the electrically introduced power, $cp_{Exh}$ the specific thermal capacity of the exhaust gas at a constant pressure, $m_{EHC}$ the mass of electric heating element 4, $cp_{EHC}$ the specific thermal capacity at a constant pressure for electric heating element 4, $\Delta T_{Exh}$ the first temperature difference between exhaust-gas temperature $T_{ExhDs}$ downstream and exhaust gas temperature $T_{Exhs}$ upstream from the at least one exhaust-gas aftertreatment component 5, $\Delta T_{EHC}$ the second temperature difference $D_2$ between the setpoint temperature $T_{EHC,Setpoint}$ for electric heating element 4 and actual temperature $T_{EHC,actual}$ of electric heating element 4, $ti_{HeatUp}$ the heating time of electric heating element 4 to reach the setpoint temperature $T_{EHC,Setpoint}$, $\alpha$ the heat transition coefficient, and A the exposed surface of the at least one exhaust gas aftertreatment component 5.

The electric heating power $Pwr_{EHC}$ for electric heating element 4 thus results as:

$$Pwr_{EHC} = dm_{Exh} \cdot cp_{Exh} \cdot \Delta T_{Exh} + m_{EHC} \cdot cp_{EHC} \cdot \frac{\Delta T_{EHC}}{ti_{HeatUp}} + \alpha \cdot A \cdot (T_{Env} - T_{EHC,1st}).$$

From these dependencies, it is now possible to directly ascertain exhaust-gas mass flow $dm_{Exh}$ in the following manner:

$$dm_{Exh} = \frac{\left(Pwr_{EHC} - m_{EHC} \cdot cp_{EHC} \cdot \frac{\Delta T_{EHC}}{ti_{HeatUp}} - \alpha \cdot A \cdot (T_{Env} - T_{EHC,1st})\right)}{(cp_{Exh} \cdot \Delta T_{Exh})}$$

The electrically introduced power $Pwr_{EHC}$ into electric heating element 4 is able to be ascertained from the measured electric current $I_{EHC}$ and the voltage $U_{EHC}$ during the heating process of electric heating element 4:

$$Pwr_{EHC} = U_{EHC} \cdot I_{EHC}$$

with $U_{EHC}$ being the voltage, and I being the electric current of the heating circuit of electric heating element 4.

The increase in the exhaust-gas temperature $\Delta T_{Exh}$ by introduced electric heating power $Pwr_{EHC}$ is able to be ascertained with the aid of the temperatures upstream and downstream from electric heating element 4.

Under the assumption that a perfect insulation of the at least one exhaust-gas aftertreatment component 5 from the environment is provided, the term $dQ_{EHC \to Env}$ may be ignored.

If actual temperature $T_{EHC,1st}$ of electric heating element 4 reaches setpoint temperature $T_{EHC,setpoint}$ and if it is present for a predefinable time period $ti_{HeatUp}$, then a stationary state may be assumed for the temperature of the electric heating element. Thus, the term $\Delta T_{EHC}$ becomes equal to zero. Therefore, the electrically introduced power $Pwr_{EHC}$ into electric heating element 4 is used in its entirety to heat the supplied (cold) gas because the heating element has already reached setpoint temperature $T_{EHC,Setpoint}$.

In an alternative embodiment, time period $ti_{HeatUp}$ is able to be ascertained as a function of setpoint temperature $T_{EHC,setpoint}$ and/or actual temperature $T_{EHC,actual}$. In a preferred embodiment, a starting difference between setpoint temperature $T_{EHC,Setpoint}$ and actual temperature $T_{EHC,actual}$ is ascertained by control device 100. When setpoint temperature $T_{EHC,Setpoint}$ is reached, time period $ti_{HeatUp}$ at with which a stationary state is present for electric heating element 4 will then be determined, preferably from a program map.

The used program map for electric heating element 4 is able to be ascertained in an application phase on a test bench and can subsequently be stored in control device 100.

The equation is therefore simplified as:

$$dm_{Exh} = \frac{Pwr_{EHC}}{(cp_{Exh} \cdot \Delta T_{Exh})} = \frac{Pwr_{EHC}}{(cp_{Exh} \cdot (T_{ExhDs} - T_{ExhUs}))}$$

As soon as the temperature of electric heating element 4 settles to a stationary value, the exhaust-gas mass flow $dm_{Exh}$ can be directly inferred based on introduced electric heating power $Pwr_{EHC}$, the specific thermal capacity of the exhaust gas at a constant pressure $cp_{Exh}$ and first temperature difference $\Delta T_{Exh}$ between exhaust-gas temperature $T_{ExhDs}$ downstream and exhaust-gas temperature $T_{ExhUs}$ upstream from the at least one exhaust-gas aftertreatment component 5.

By way of example, FIG. 2 shows a first sequence of the method for controlling internal combustion engine 10 including at least one exhaust-gas aftertreatment component 5 having an electric heating element 4. The essential steps of the method according to the present invention are described by way of example.

In a first step 200, release conditions for the method are checked. To this end, it is monitored with the aid of control device 100 whether an activation of electric heating element 4 of the at least one exhaust-gas aftertreatment component 5 is taking place. The activation of electric heating element 4 is preferably implemented by a heater control calculated in control device 100. In addition, it is monitored whether internal combustion engine 10 is in a trailing-throttle operation. Control device 100 is developed in such a way that the trailing-throttle operation of internal combustion engine 10 is detected with the aid of an operation coordinator, which is implemented on control device 100. During a trailing-throttle operation for internal combustion engine 10, no fuel is injected into the cylinders of internal combustion engine 10. For this reason, exhaust-gas mass flow $dm_{Exh}$ is identical or virtually identical to fresh-air mass flow $dm_{Air}$ in a trailing-throttle operation. Thus, if a trailing-throttle operation and an activated electric heating element 4 are present, then the release for the present method is granted and the method is continued in a step 210.

In a step 210, electric heating element 4 is now brought to setpoint temperature $T_{EHC,Setpoint}$ specified by the heater control. This is preferably accomplished with the aid of a setpoint-actual control by control device 100. If actual temperature $T_{EHC,actual}$ of the electric heating element reaches setpoint temperature $T_{EHC,Setpoint}$, a predefinable time period $ti_{HeatUp}$ is preferably started. When the predefined time period $ti_{HeatUp}$ has elapsed, a stationary state is assumed for electric heating element 4. A stationary state for electric heating element 4 in particular is understood as a state in which it is assumed that electric heating element 4 predominantly or fully transfers its thermal energy to the passing exhaust gas. When the predefinable time period has elapsed and a stationary state therefore exists, the method is continued in step 220.

In an alternative embodiment, the stationary state for electric heating element 4 is present when predefinable time period $i_{HeatUp}$ has elapsed with the start of the setpoint-actual control. Control device 100 preferably ascertains predefinable time period $ti_{HeatUp}$ like a countdown, and the stationary state for electric heating element 4 will then be present when predefinable time period $ti_{HeatUp}$ has elapsed.

In a step 220, control device 100 then continually ascertains first temperature $T_{exhUs}$ and second temperature $T_{ExhDs}$. Also continually ascertained by control device 100 are electric current $I_{EHC}$, voltage $U_{EHC}$ and fresh-air mass flow $dm_{air}$.

In a preferred embodiment, first and second temperature $T_{exhUs}, T_{exhDs}$ and electric current $I_{EHC}$, voltage $U_{EHC}$ and fresh-air mass flow $dm_{air}$ are averaged across a predefinable time period.

Next, control device 100 ascertains a first temperature difference $\Delta T_{Exh}$ between the second and first temperature $T_{exhDs}, T_{exhUs}$ or the averaged temperatures of the second and first temperature $T_{exhDs}, T_{exhUs}$. Using control device 100, the electric heating power $Pwr_{EHC}$ of electric heating element 4 is ascertained as a function of the measured electric current $I_{EHC}$ and voltage $U_{EHC}$.

If first temperature difference $\Delta T_{Exh}$ between the second temperature and the first temperature difference $\Delta T_{Exh}$ is greater than zero degrees or Kelvin, exhaust-gas mass flow $dm_{Exh}$ is ascertained with the aid of the formula:

$$dm_{Exh} = \frac{Pwr_{EHC}}{(cp_{Exh} \cdot \Delta T_{Exh})}$$

and the method is continued with step 230. In the other case, the method is started anew from the beginning or is terminated.

In a step 230, a comparison between ascertained exhaust-gas mass flow $dm_{exh}$ and fresh-air mass flow $dm_{air}$ is performed. In a preferred embodiment, the comparison may be realized as a difference between ascertained exhaust-gas mass flow $dmex_h$ and fresh-air mass flow $dm_{air}$.

If the ascertained difference exceeds a predefinable upper threshold value $S_{max}$ or if the difference undershoots a predefinable lower threshold value $S_{min}$, fresh-air mass flow $dm_{air}$ is detected as implausible. In addition, the employed air-mass meter 9 (HFM, PFM) may be identified as defective as a function of a predefinable debouncing or a filter, and/or an engine control light on the dashboard can be activated. In the other case, fresh-air mass flow $dm_{air}$ is detected as valid, and the method may be terminated or be run through again from the beginning in step 200.

By way of example, FIG. 3 shows a second sequence of the method for controlling an internal combustion engine 10 including at least one exhaust-gas aftertreatment component 5 having an electric heating element 4 and an optional secondary air system. The essential steps of the method of the present invention are described by way of example.

In a first step 300, a release condition for the method is checked. For this purpose, it is monitored with the aid of control device 100 whether an activation of electric heating element 4 of the at least one exhaust-gas aftertreatment component 5 is implemented. The activation of electric heating element 4 is preferably implemented by a heater control calculated in control device 100. If an activated electric heating element 4 is detected, then the release for the method is granted, and the method is continued in a step 310.

In a step 310, electric heating element 4 is then brought to setpoint temperature $T_{EHC,Setpoint}$ specified by the heater control. This is preferably done via a setpoint-actual control by control device 100. If actual temperature $T_{EHC,actual}$ of the electric heating element reaches setpoint temperature $T_{EHC,Setpoint}$, a predefinable time period $ti_{HeatUp}$ is preferably started. When predefinable time period $ti_{HeatUp}$ has elapsed, a stationary state of electric heating element 4 is assumed. A stationary state of electric heating element 4 is particularly understood as a state in which it is assumed that electric heating element 4 predominantly or completely transmits its thermal energy to the passing exhaust gas. When the predefinable time period has elapsed and a stationary state thus prevails, the method is continued with step 320.

In an alternative embodiment, the stationary state for electric heating element 4 is present when the predefinable time period $ti_{HeatUp}$ has elapsed upon the start of the setpoint-actual control. Predefinable time period $ti_{HeatUp}$ is preferably ascertained like a countdown by control device 100, and with the elapsing of predefinable time period $ti_{HeatUp}$, the stationary state is then attained for electric heating element 4.

In a step 320, first temperature $T_{exhUs}$ and second temperature $T_{exhDs}$ are now continuously ascertained by control device 100. In addition, control device 100 continually ascertains measured electric current $I_{EHC}$, voltage $U_{EHC}$ and fresh-air mass flow $dm_{air}$.

In a preferred embodiment, first and second temperature $T_{ExhUs}, T_{ExhDs}$ and electric current $I_{EHC}$, voltage $U_{EHC}$ and fresh-air mass flow $dm_{air}$ are averaged across a predefinable period of time. In addition, injected fuel mass $q_{inj}$ and optionally a secondary air-mass flow $dm_{sec}$ are ascertained by control device 100.

A first temperature difference $\Delta T_{Exh}$ between second and first temperature $T_{ExhDs}, T_{ExhUs}$ or the averaged temperatures of second and first temperature $T_{ExhDs}, T_{ExhUs}$ is then ascertained by control device 100. With the aid of control device 100, the electric heating power $Pwr_{EHC}$ of electric heating element 4 is then ascertained as a function of measured electric current $I_{EHC}$ and voltage $U_{EHC}$. If first temperature difference $\Delta T_{Exh}$ between the second temperature and the first temperature difference $\Delta T_{Exh}$ is greater than zero degrees or Kelvin, exhaust-gas mass flow $dm_{Exh}$ is ascertained using the formula:

$$dm_{Exh} = \frac{Pwr_{EHC}}{(cp_{Exh} \cdot \Delta T_{Exh})}$$

and the method is continued in step 330. In the other case, the method is started from the beginning in step 300 or is terminated.

In a step 330, control device 100 then ascertains a modeled exhaust-gas mass flow $dm_{Exh,mod}$ as a function of ascertained fuel mass $q_{inj}$, fresh-air mass flow $dm_{air}$ and secondary air-mass flow $dm_{Sec}$. Modeled exhaust-gas flow $dm_{Exh,mod}$ corresponds to an expected mass flow. This modeled exhaust-gas mass flow $dm_{Exh,mod}$ is then compared to exhaust-gas mass flow $dm_{Exh}$ ascertained in step 320.

In a preferred embodiment, the comparison may be carried out as a difference between exhaust-gas mass flow $dm_{Exh}$ ascertained in step 320 and modeled exhaust-gas mass flow $dm_{Exh,mod}$.

If the ascertained difference exceeds a predefinable upper threshold value $S_{max}$ or if the difference undershoots a predefinable lower threshold value $S_{min}$, then an uneven flow towards electric heating element 4 by an exhaust-gas mass flow is inferred. In addition, a fault reaction such as the deactivation or a restriction of the heating power for electric heating element 4 is able to be implemented by control device 100 as a function of a predefinable debouncing or a filter. If an exhaust-gas mass flow fails to appear or is too low, a quite different flow through electric heating element 4 (hot spots) may locally occur so that electric heating element will be irreparably destroyed, or the service life be unintentionally affected. In a very uneven flow through electric heating element 4, it may happen that the heat generated by the electric heating is not evenly carried away in a convective manner or carried away only at certain locations of electric heating element 4 or not at all. Local overheating (hot spots) may therefore arise at these locations. Through the restriction of the heating power or by switching electric heating element 4 off, a component protection is able to be realized. In the other case, a functional exhaust-gas mass flow is inferred, and the method can be terminated or started anew from the beginning.

What is claimed is:

1. A method for controlling an internal combustion engine including at least one exhaust-gas aftertreatment component having an electric heating element, the electric heating element heating the at least one exhaust-gas aftertreatment component and exhaust gas flowing through the at least one exhaust-gas aftertreatment component, the electric heating element being briefly or permanently acted upon by a heating current, constantly or in alternation, a gas, including fresh air and/or exhaust gas, flowing downstream through an exhaust-gas path, the method comprising the following steps:
   ascertaining a first temperature upstream from the at least one exhaust-gas aftertreatment component;
   ascertaining a second temperature downstream from the at least one exhaust-gas aftertreatment component;
   ascertaining an exhaust-gas mass flow of the internal combustion engine as a function of a first temperature difference between the first temperature and the second temperature, and a heating power of the electric heating element; and
   controlling the internal combustion engine as a function of the exhaust-gas mass flow.

2. The method as recited in claim 1, wherein a release for the method is granted when a trailing-throttle operation is detected for the internal combustion engine and/or when an activation of the electric heating element has occurred.

3. The method as recited in claim 1, wherein a stationary state exists for the electric heating element when an actual temperature for the electric heating element exceeds a setpoint temperature for the electric heating element for a predefinable time period.

4. The method as recited in claim 1, wherein a stationary state is present for the electric heating element when a predefinable time period after the electric heating element was activated has elapsed.

5. The method as recited in claim 1, wherein the at least one exhaust-gas aftertreatment component is a three-way catalytic converter or a particulate filter or a selective catalytic reduction catalyst or a NOx storage catalyst or an oxidation catalyst.

6. The method as recited in claim 1, wherein the electric heating power is ascertained as a function of a voltage and an electric current for the electric heating element.

7. The method as recited in claim 1, wherein the exhaust-gas mass flow ($dm_{Exh}$) is ascertained according to the following formula:

$$dm_{Exh} = \frac{Pwr_{EHC}}{(cp_{Exh} \cdot \Delta T_{Exh})} = \frac{Pwr_{EHC}}{(cp_{Exh} \cdot (T_{ExhDs} - T_{ExhUs}))}$$

with $Pwr_{EHC}$ being the electrically introduced power into the electric heating element, $cp_{Exh}$ being the specific thermal capacity of the exhaust gas at a constant pressure, $\Delta T_{Exh}$ being the first temperature difference between the exhaust-gas temperature $T_{ExhDs}$ downstream and the exhaust-gas temperature $T_{ExhUs}$ upstream from the at least one exhaust-gas aftertreatment component.

8. The method as recited in claim 2, wherein a fresh-air mass flow is compared to the exhaust-gas mass flow, and a defective air-mass sensor is identified as a function of whether a difference between the fresh-air mass flow and the exhaust-gas mass flow exceeds or undershoots a predefinable upper or lower threshold value.

9. The method as recited in claim 1, wherein a modeled exhaust-gas mass flow is ascertained as a function of a fresh-air mass flow, a secondary air mass flow, and an injected fuel quantity, and when a difference between the modeled exhaust-gas mass flow and the exhaust-gas mass flow exceeds or undershoots an upper or lower threshold value, the heating power for the electric heating element is shut off or restricted.

10. The method as recited in claim 9, wherein when a deactivation or restriction of the heating power for the electric heating element is detected, an error bit is set in the control device or an engine control light is activated on a dashboard.

11. A non-transitory electronic memory medium on which is stored a computer program for controlling an internal combustion engine including at least one exhaust-gas aftertreatment component having an electric heating element, the electric heating element heating the at least one exhaust-gas aftertreatment component and exhaust gas flowing through the at least one exhaust-gas aftertreatment component, the electric heating element being briefly or permanently acted upon by a heating current, constantly or in alternation, a gas, including fresh air and/or exhaust gas, flowing downstream through an exhaust-gas path, the computer program, when executed by a computer, causing the computer to perform the following steps:
   ascertaining a first temperature upstream from the at least one exhaust-gas aftertreatment component;

ascertaining a second temperature downstream from the at least one exhaust-gas aftertreatment component;

ascertaining an exhaust-gas mass flow of the internal combustion engine as a function of a first temperature difference between the first temperature and the second temperature, and a heating power of the electric heating element; and controlling the internal combustion engine as a function of the exhaust-gas mass flow.

12. A device comprising:

a control device configured to control an internal combustion engine including at least one exhaust-gas aftertreatment component having an electric heating element, the electric heating element heating the at least one exhaust-gas aftertreatment component and exhaust gas flowing through the at least one exhaust-gas aftertreatment component, the electric heating element being briefly or permanently acted upon by a heating current, constantly or in alternation, a gas, including fresh air and/or exhaust gas, flowing downstream through an exhaust-gas path, the control device configured to:

ascertain a first temperature upstream from the at least one exhaust-gas aftertreatment component;

ascertain a second temperature downstream from the at least one exhaust-gas aftertreatment component;

ascertain an exhaust-gas mass flow of the internal combustion engine as a function of a first temperature difference between the first temperature and the second temperature, and a heating power of the electric heating element; and control the internal combustion engine as a function of the exhaust-gas mass flow.

13. The method as recited in claim 8, wherein when a defective air-mass sensor is detected, an error bit is set in the control device or an engine control light is activated on a dashboard.

* * * * *